(12) United States Patent
Duncan et al.

(10) Patent No.: US 8,614,795 B2
(45) Date of Patent: Dec. 24, 2013

(54) SYSTEM AND METHOD OF DISTRIBUTED FIBER OPTIC SENSING INCLUDING INTEGRATED REFERENCE PATH

(75) Inventors: Roger Duncan, Christianburg, VA (US); Brooks Childers, Christiansburg, VA (US); Philip Robin Couch, Honiton (GB)

(73) Assignee: Baker Hughes Incorporated, Houston, TX (US)

( * ) Notice: Subject to any disclaimer, the term of this patent is extended or adjusted under 35 U.S.C. 154(b) by 125 days.

(21) Appl. No.: 13/187,853

(22) Filed: Jul. 21, 2011

(65) Prior Publication Data

US 2013/0021615 A1 Jan. 24, 2013

(51) Int. Cl.
*G01B 9/02* (2006.01)
(52) U.S. Cl.
USPC .......................................... 356/477
(58) Field of Classification Search
USPC ................................. 356/477, 35.5
See application file for complete search history.

(56) References Cited

U.S. PATENT DOCUMENTS 7,548,319 B2 * 6/2009 Hartog ........................ 356/478
2007/0146721 A1 6/2007 Barcelos et al.

OTHER PUBLICATIONS

Froggatt et al. "Vibration Tolerant Swept Wavelength Interferometry." Optical Fiber Communication Conference (OFC) Anaheim, California, Mar. 6, 2005. [from Internet: http://www.ofcnfoec.org/about_ofc/archive/2005/PDFs/PDP8.pdf].

Inaudi, Daniele et al., Distributed Fiber Optic Strain and Temperature Sensing for Structural Health Monitoring, Jul. 16-19, 2006, 8 pages, The Third Int'l Conference on Bridge Maintenance, Safety and Management.
Martin, Haydn, et al. (2008) "Vibration compensating beam scanning interferometer for surface measurement." Applied Optics, 47 (7). pp. 888-893.
Udd, Eric, Overview of Fiber Optic Sensors, Apr. 10, 1995, vol. 66, No. 8, 4015-4030, Blue Road Research.

* cited by examiner

*Primary Examiner* — Gregory J Toatley
*Assistant Examiner* — Susan Middleton
(74) *Attorney, Agent, or Firm* — Cantor Colburn LLP

(57) ABSTRACT

An apparatus for estimating a parameter includes: an optical fiber including at least one core configured to transmit an interrogation signal and including a plurality of sensing locations distributed along a measurement length of the optical fiber and configured to reflect light; a reference optical path configured to transmit a reference signal, the reference optical path disposed in a fixed relationship to the at least one core and extending at least substantially parallel to the at least one core, the reference optical path including a reference reflector that defines a cavity length corresponding to the measurement length; a detector configured to receive a reflected return signal; a reference interferometer configured to receive at least a reference signal and generate an interferometric reference signal; and a processor configured to apply the interferometric reference signal to the reflected return signal to compensate for one or more environmental parameters.

20 Claims, 4 Drawing Sheets

SYSTEM AND METHOD OF DISTRIBUTED FIBER OPTIC SENSING INCLUDING INTEGRATED REFERENCE PATH

BACKGROUND

Fiber-optic sensors have been utilized in a number of applications, and have been shown to have particular utility in sensing parameters in various environments. Optical fiber sensors can be incorporated into environments such as downhole environments and be used to sense various parameters of an environment and/or the components disposed therein, such as temperature, pressure, strain and vibration.

Parameter monitoring systems can be incorporated with downhole components as fiber-optic distributed sensing systems (DSS). Examples of DSS techniques include Optical Frequency Domain Reflectometry (OFDR), which includes interrogating an optical fiber sensor with an optical signal to generate reflected signals scattered from sensing locations (e.g., fiber Bragg gratings) in the optical fiber sensor.

Swept-wavelength interferometric-based sensing systems, frequently used for distributed fiber-optic sensing, are so-called because they rely upon interferometry to encode the sensor information. In some applications, however, the sensing fiber (the fiber containing or consisting of the sensor(s)) is subject to vibrations. These vibrations can result in a smearing of data, and can ultimately reduce data fidelity or inhibit the ability to make a measurement altogether.

SUMMARY

An apparatus for estimating a parameter includes: an optical fiber including at least one core configured to be optically coupled to a light source and transmit an interrogation signal, the at least one core including a plurality of sensing locations distributed along a measurement length of the optical fiber and configured to reflect light; a reference optical path configured to transmit a reference signal, the reference optical path disposed in a fixed relationship to the at least one core and extending at least substantially parallel to the at least one core, the reference optical path including a reference reflector that defines a cavity length corresponding to the measurement length; a detector configured to receive a reflected return signal including light reflected from one or more of the plurality of sensing locations; a reference interferometer configured to receive at least a reference signal returned from the reference optical path and generate an interferometric reference signal; and a processor configured to apply the interferometric reference signal to the reflected return signal to compensate for one or more environmental parameters.

A method for estimating a parameter includes: disposing an optical fiber in a borehole in an earth formation, the optical fiber including at least one core having a plurality of sensing locations distributed along a measurement length of the optical fiber and configured to reflect light; disposing in the borehole a reference optical path configured to transmit a reference signal, the reference optical path disposed in a fixed relationship to the at least one core and extending at least substantially parallel to the at least one core, the reference optical path including a reference reflector that defines a cavity length corresponding to the measurement length; transmitting a first interrogation signal into the at least one core; transmitting a second interrogation signal into the reference optical path; receiving a reflected return signal including light reflected from one or more of the plurality of sensing locations; receiving, at a reference interferometer, a reference signal returned from the reference optical path, and generating an interferometric reference signal; applying the interferometric reference signal to the reflected return signal to compensate for one or more environmental parameters based on changes in the cavity length of the reference optical path; and estimating one or more environmental parameters based on the compensated reflected return signal.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
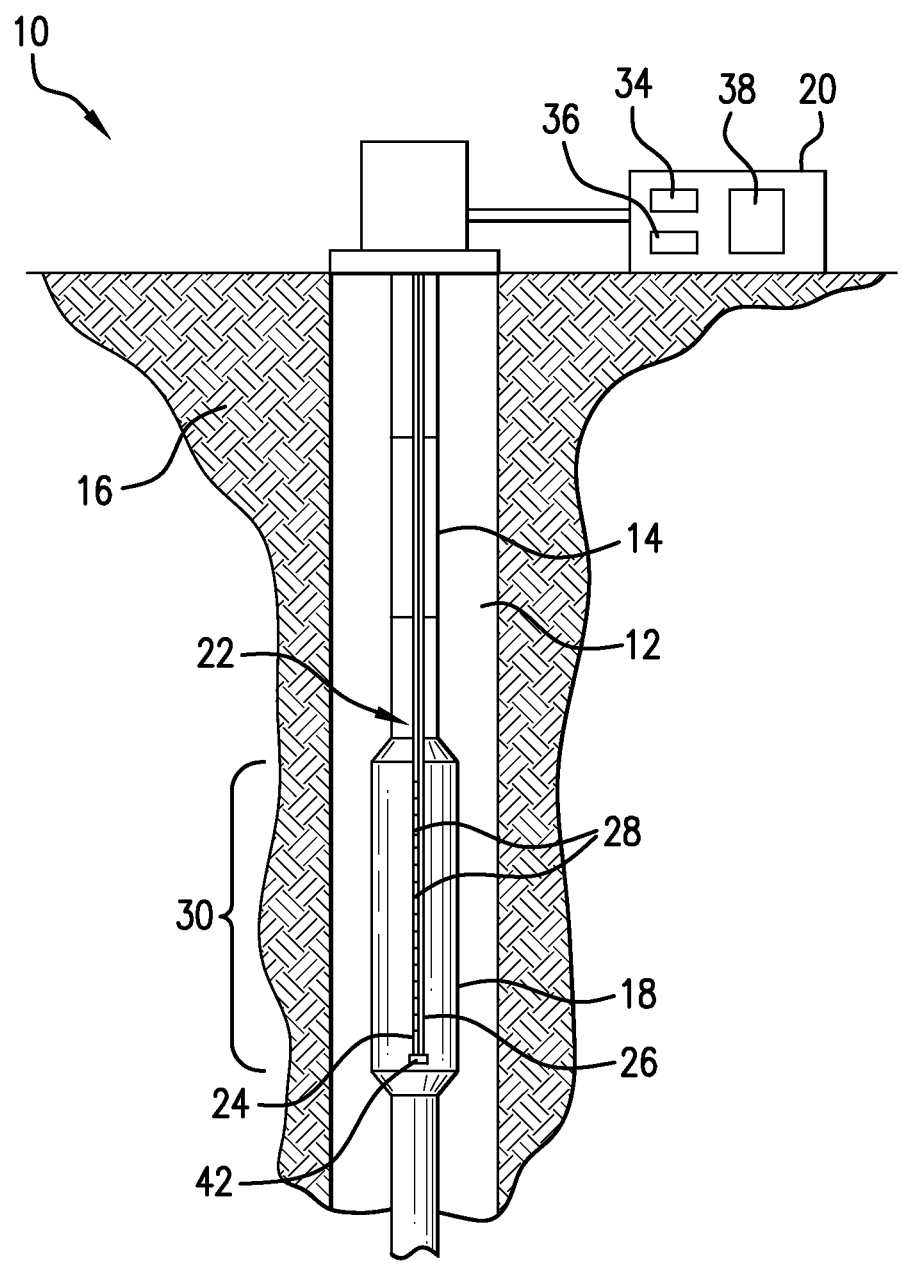
FIG. 1 illustrates an exemplary embodiment of a downhole drilling, monitoring, evaluation, exploration and/or production system.

Referring to FIG. 1, an exemplary embodiment of a downhole drilling, monitoring, evaluation, exploration and/or production system 10 disposed in a wellbore 12 is shown. A borehole string 14 is disposed in the wellbore 12, which penetrates at least one earth formation 16 for performing functions such as extracting matter from the formation and/or making measurements of properties of the formation 16 and/or the wellbore 12 downhole. The borehole string 14 is made from, for example, a pipe, multiple pipe sections or flexible tubing. The system 10 and/or the borehole string 14 include any number of downhole tools 18 for various processes including drilling, hydrocarbon production, and measuring one or more physical quantities in or around a borehole. Various measurement tools 18 may be incorporated into the system 10 to affect measurement regimes such as wireline measurement applications or logging-while-drilling (LWD) applications.

In one embodiment, a parameter measurement system is included as part of the system 10 and is configured to measure or estimate various downhole parameters of the formation 16, the borehole 14, the tool 18 and/or other downhole components. The measurement system includes an optical interrogator or measurement unit 20 connected in operable communication with at least one optical fiber sensing assembly 22. The measurement unit 20 may be located, for example, at a surface location, a subsea location and/or a surface location on a marine well platform or a marine craft. The measurement unit 20 may also be incorporated with the borehole string 12 or tool 18, or otherwise disposed downhole as desired.

An optical fiber assembly 22 is operably connected to the measurement unit 20 and is configured to be disposed downhole. The optical fiber assembly 22 includes at least one optical fiber core 24 (referred to as a "sensor core" 24) configured to take a distributed measurement of a downhole parameter (e.g., temperature, pressure, stress, strain and others) and at least one optical fiber core 26 (referred to as a "system reference core" 26) configured to generate a reference signal. The sensor core 24 includes one or more sensing locations 28 disposed along a length of the sensor core, which are configured to reflect and/or scatter optical interrogation signals transmitted by the measurement unit 20. Examples of sensing locations 28 include fibre Bragg gratings, Fabry-Perot cavities, partially reflecting mirrors, and locations of intrinsic scattering such as Rayleigh scattering, Brillouin scattering and Raman scattering locations. The system reference core 26 is disposed in a fixed relationship to the sensor core 24 and provides a reference optical path having an effective cavity length that is stable relative to the optical path cavity length of the sensor core 24. The system reference core can be used to return reference signals used by a reference interferometer for compensating the distributed measurements based on changes in the cavity length caused by, e.g., vibration.

In one embodiment, a length of the optical fiber assembly 22 defines a measurement region 30 along which distributed parameter measurements may be taken. For example, the measurement region 30 extends along a length of the assembly that includes sensor core sensing locations 28. The system reference core 26 is disposed relative to the sensor core 24 and provides a reference path having an effective cavity length that is stable relative to the optical path cavity length of the sensor core 24 in the measurement region 30, which acts to moderate or reduce the effects of vibration and other movement in the system. For example, the sensor core 24 and the system reference core 26 are disposed in respective optical fibers that are disposed together in an optical fiber cable, adhered to one another or otherwise disposed so that at least the lengths of each core in the measurement region 30 deform together in response to downhole parameters. The reference optical path and the sensing path are thus configured so that they are in a fixed position relative to one another, so that the reference path experiences the same vibration or other movement as the sensing path. In one embodiment, the sensor core 24 and the system reference core 26 are disposed within a multi-core optical fiber 32.

The measurement unit 20 includes, for example, one or more electromagnetic signal sources 34 such as a tunable light source, a LED and/or a laser, and one or more signal detectors 36 (e.g., photodiodes). Signal processing electronics may also included in the measurement unit 20, for combining reflected signals and/or processing the signals. In one embodiment, a processing unit 38 is in operable communication with the signal source 34 and the detector 36 and is configured to control the source 34, receive reflected signal data from the detector 36 and/or process reflected signal data.

In one embodiment, the measurement system is configured as a coherent optical frequency-domain reflectometry (OFDR) system. In this embodiment, the source 34 includes a continuously tunable laser that is used to spectrally interrogate the optical fiber sensing assembly 22. In one embodiment, the interrogation signal has a wavelength or frequency that is modulated or swept (e.g., linearly) over a selected wavelength or frequency range. Scattered signals reflected from intrinsic scattering locations, sensing locations 28 and other reflecting surfaces in the optical fiber assembly 22 may be detected, demodulated, and analyzed. Each scattered signal can be correlated with a location by, for example, a mathematical transform or interferometrically analyzing the scattered signals in comparison with a selected common reflection location. Each scattered signal can be integrated to reconstruct the total length and/or shape of the cable. A modulator (e.g., function generator) in optical communication with the tunable optical source 34 may be provided that modulates the optical source 34, such as by power, intensity or amplitude, using a modulation signal.

Figure 2:
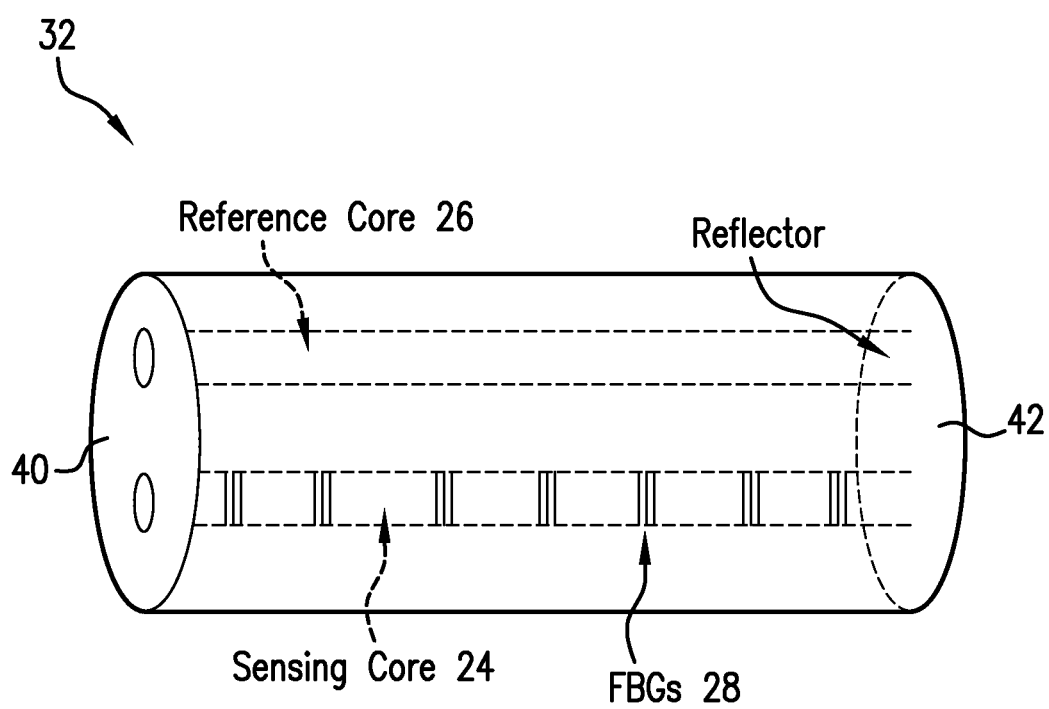
FIG. 2 illustrates an exemplary embodiment of a portion of a fiber optic measurement assembly.

Referring to FIG. 2, an exemplary optical fiber assembly 22 includes a multi-core fiber 32 having the at least two cores 24, 26 and a cladding 40. The sensing core 24 is configured to guide light from the measurement unit 20 to the measurement locations 28, and the at least one system reference core 26 is configured to guide a reference light signal from the measurement unit. The cores 24, 26 may receive an interrogation signal from a single measurement unit 20 or a single source 34, or receive individual signals from separate sources 34. One or more sensor and/or reference reflectors 42 are positioned at selected axial locations to provide reference signals. In one embodiment, the reflector(s) 42 are disposed so that part of an interrogation signal in each core 24, 26 is reflected from the reflector(s) 42 at substantially the same axial location for each core. In the example shown in FIG. 2, the reflectors 42 include a single reference reflector 42 such as a mirror, which is positioned at an axial location common to each core. The reference reflector may be disposed at an end of the optical fiber assembly 22 and/or at one or more locations along the length of the measurement region 30. A cavity length is thus formed between a selected axial location and an axial location of each reflector 42. For example, the reflector 42 may include multiple partially reflective mirrors disposed at different axial locations along the fiber optic assembly 22 and forming multiple respective cavity lengths.

In one embodiment, the sensing core 24 forms one or more components of a sensor interferometer. For example, the sensor interferometer may be formed from return signals reflected along a sensor path, i.e., a return signal path from a sensing location 28 and an axial location (e.g., the end of the sensing core 24 coupled to the detector 36), and from a return signal reflected along a sensor reference path, i.e., a return signal path in the core 24 between the reflector 42 and the axial location. Each of these return signals may be returned to the measurement unit 20 where they can be combined to generate interferometric signals for parameter measurements. An additional interferometer (a reference interferometer) may be formed by a reference path return signal, i.e., a return signal in the system reference core 26 reflected along a system reference path between the reflector 42 and the axial location. It should be noted that, although the sensor path and the reference path are included in separate cores, these paths may be established in a single core. In addition, the sensor core 24 and the system reference core 26 may be included in separate optical fibers that are adhered together, disposed in a single cable and/or otherwise disposed so that the system reference path is disposed in a fixed relationship to the core 24 and extends at least substantially parallel to the core 24.

The system reference core 26 and system reference return signal can be used to compensate for, e.g., the effects of non-linearities in the case that the system 10 utilizes swept-wavelength interferometry (SWI). Because the SWI-based interrogation unit (e.g., the optical fiber assembly 22) may be subject to vibration, and because the sensing core 24 is often subject to different stimuli, the vibration can potentially produces reduced data fidelity. This happens because the effective cavity length of the interferometer formed by the sensor core 24 and the reflector 42 (and corresponding to the measurement length 30) changes during the course of an acquisition. The configurations of the cores 24 and the 26 relative to one another allows for compensation of vibration effects.

Figure 3:
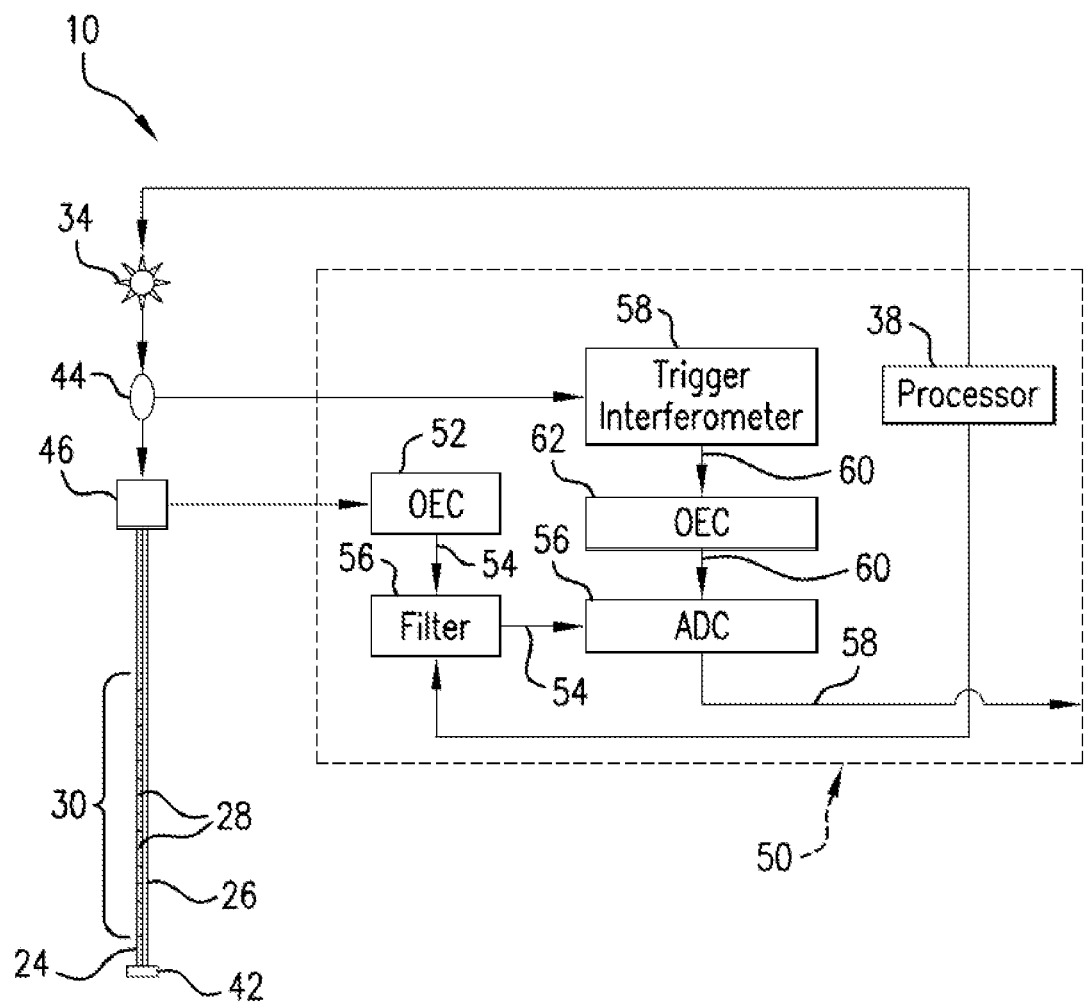
FIG. 3 illustrates an exemplary embodiment of a fiber optic measurement assembly.

Referring to FIG. 3, an embodiment of the system 10 is shown, in which the system interferometer is configured as a trigger interferometer. In this embodiment, a tunable laser or other light source 34 (e.g., swept-wavelength light source) is coupled to a beam splitter 44 configured to split light from the light source into at least one sensor beam and at least one reference beam. A coupling device 46 is configured to direct the sensor beam into the sensor core 24 and direct the reference beam into the reference core 26.

In one embodiment, the measurement unit 20 includes a processing assembly 50 that is configured to receive input light beams as well as return signals from the optical fiber assembly 22. For example, light reflected and/or scattered from each sensing location 28 (the "sensor return signal") and light in the sensor core 24 reflected from the reflector 42 (the "sensor reference return signal") are combined to generate a sensor interferometric signal in the form of an interference pattern indicative of phase differences between the sensor return signal and the sensor reference return signal. The interference of the sensor reference return signal with the sensor return signal occurs at a particular optical path length of the sensor, also known as the spatial frequency of the sensor.

Light in the system reference core 26 reflected from the reflector 42 (system reference return signal) is used in a reference interferometer. For example, the system reference return signal is directed to the measurement unit 20 and is combined with the initial sensor beam or the split sensor beam to generate an interference pattern indicative of changes in the cavity length formed between an axial location (e.g., the circulator 44 location) and the reference reflector 42. This change in cavity length can be used as indicative of changes in the overall measurement path 30, produced by parameters such as temperature, stress and vibration. This reference interferometer may be used to compensate the sensor interferometer data for parameter changes occurring for the entire length of the measurement region 30, allowing for higher quality measurements of local parameters measured using the measurement locations 28.

Referring again to FIG. 3, in one embodiment, the processing assembly 50 includes a detector 52 such as an optical-electrical converter (OEC) that receives the reflected light from core 24 (e.g., the sensor return signal, the sensor reference return signal, or a combined signal) via the circulator 46. The detector 52 may be any suitable detector for converting an optical signal into an electrical signal, such as a photodetector, or a charge-coupled device. In one embodiment, the detector 52 produces an electrical signal 54 that corresponds to the waveform of the received light. The electrical signal 54 is sent via an optional filter 56 (e.g., a programmable anti-aliasing filter) that filters out the noise signals.

In one embodiment, the processing assembly 50 includes a sampler 56 such as an analog-to-digital converter (ADC). The sampler 56 receives the electrical signal 54 and samples the signal according to selected sampling parameters, such as sampling frequency and duration, which produces a sampled signal 58 that may be sent to a processor such as the processor 38 or a remote processor. The sampler 56 may receive sampling parameters from an external clock or a waveform corresponding to a particular sensor, a wavelength shift at the particular sensor, a strain at the sensor, a temperature at the sensor, or a deformation of a member coupled to the fiber optic assembly 22. Alternatively, the parameter may be determined at any processor including processor 38.

In one embodiment, the processing assembly includes a system reference interferometer 58 configured to generate a system reference interferometric signal using the system reference return signal received from the system reference core 26. The system reference interferometric signal may be used with or applied to the signal 52 to compensate for parameters such as downhole temperatures and vibration along the measurement path 30.

In one embodiment, the system interferometer 58 is configured as a trigger interferometer 58 for generating sampling parameters based on an interferometric signal derived from the system reference return signal received from the system reference core 26. The trigger interferometer 58 receives an interference pattern signal or combines signals therein to generate the interference pattern signal that is used to establish sampling parameters. For example, the trigger interferometer 58 receives a portion of the reference beam from the beam splitter 44 and also receives the system reference return signal from the reference core 26, and combines these beams to generate the interference pattern signal.

The trigger interferometer 58 provides a trigger signal 60 based on the interference pattern signal. For example, the trigger interferometer 58 produces a trigger signal using a negative-to-positive zero-crossing of an interference fringe pattern of the interference pattern signal, such as a transition from a dark region of the fringe pattern to an adjacent illuminated region of the fringe pattern. In an alternate embodiment, the trigger signal 60 may be produced from a positive-to-negative zero-crossing. Any suitable part of the fringe pattern may be used to produce the trigger signal. In one embodiment, an OEC 62 is included to convert the trigger signal 60 from an optical signal to an electrical trigger signal. The trigger signal is sent to the sample 56 to provide sampling parameters, such as a sampling rate corresponding to the frequency of negative-to-positive zero crossings and/or a sampling duration corresponding to time windows during which the interference pattern has an amplitude or magnitude above a selected value.

Figure 4:
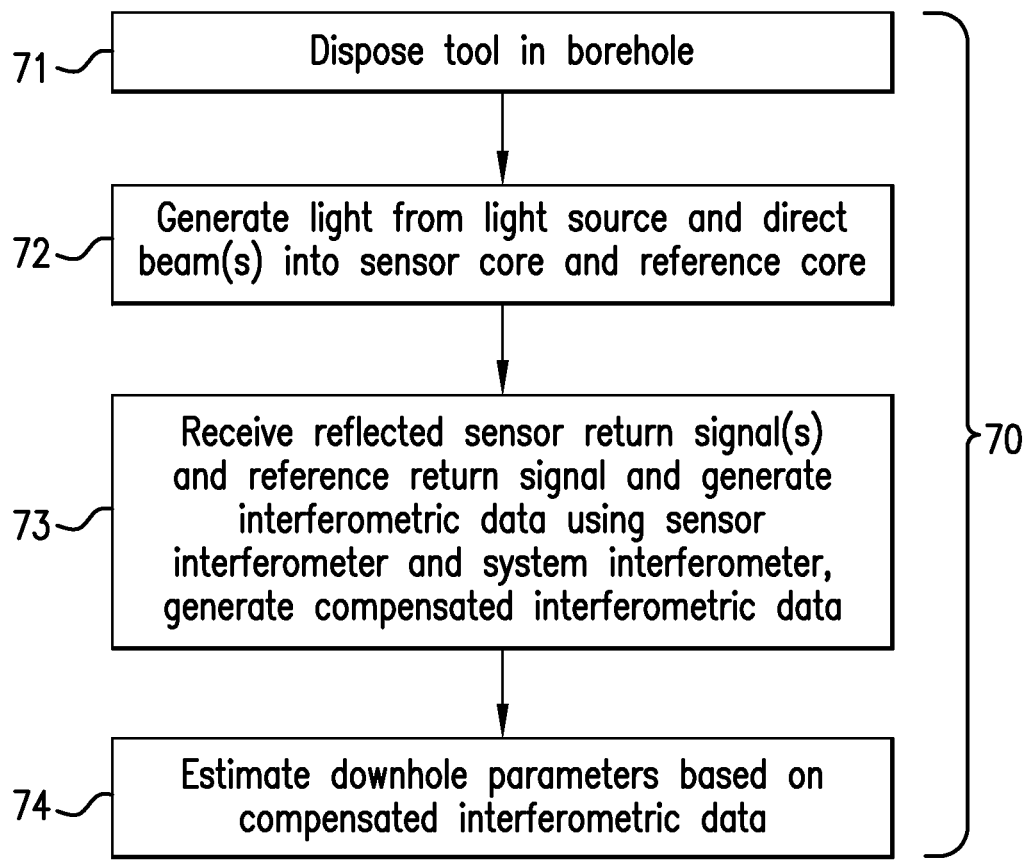
FIG. 4 is a flow chart illustrating an exemplary embodiment of a method of estimating a downhole parameter.

FIG. 4 illustrates a method 70 of measuring downhole parameters. The method 70 includes one or more stages 71-74. Although the method 70 is described in conjunction with the system 10 and the measurement system described above, the method 70 is not limited to use with these embodiments, and may be performed by the measurement unit 20 or other processing and/or signal detection device. In one embodiment, the method 70 includes the execution of all of stages 71-74 in the order described. However, certain stages may be omitted, stages may be added, or the order of the stages changed.

In the first stage 71, the optical fiber assembly 22 along with the borehole string 12, tool 18 and/or other components are lowered downhole. The components may be lowered via, for example, a wireline or a drillstring.

In the second stage 72, light from the light source 34 is sent to the beam splitter 44 which may split the light into the sensor beam for obtaining signals from one or more sensing locations 28 and the reference beam for use in a system interferometer 58 such as the trigger signal interferometer 58. In an exemplary embodiment, the beam splitter 44 splits the received light so that the sensor beam includes about 90% of the light and the reference beam includes about 10% of the light. However, any splitting ratio may be used. The reference beam may also be further split so that a portion of the reference beam is directed to the system reference interferometer 58 and another portion of the reference beam is directed to the reference core 26. The circulator 46 directs the sensor beam into the sensor core 24 and directs the reference beam into the reference core 26.

In the third stage 73, the beams propagate through their respective cores and return signals are generated and received by the detector 36 and/or the measurement unit 20. For example, light reflected and/or scattered from each sensing location 28 (sensor return signal) and light in the sensor core 24 reflected from the reflector 42 (sensor reference return signal) are combined to generate interferometric data. Light in the system reference core 26 reflected from the reflector 42

(system reference return signal) is used in the system reference interferometer 58, for example to generate a trigger signal.

The reflected signals (reference and sensor) reflected from the sensing core 24 are combined and directed to the detector 36 (e.g., via the circulator 46). In one embodiment, the signals are converted to an electronic signal via the OEC 36. The reflected reference signal from the reference core 26 is combined with the input signal (e.g., via the trigger interferometer 58) to produce an interferometric reference signal. The interferometric reference signal is combined with or otherwise applied to the sensor interferometric signal to produce a resultant signal that is compensated for vibration or other downhole parameters experienced by the measurement path.

In the fourth stage 74, the reflected signal data is utilized to estimate various parameters along the optical fiber 22, such as along the measurement path 30. The reflected signal data is correlated to locations of sensing locations 28, and parameters are estimated for one or more sensing locations 28. Examples of such parameters include temperature, pressure, vibration, strain and deformation of downhole components, chemical composition of downhole fluids or the formation, acoustic events, and others.

The systems and methods described herein provide various advantages over prior art techniques. The systems and methods provide for integration of either or both the system reference and the sensor reference with the sensing fiber, such that the system interferometer and the sensing fiber experience substantially the same vibration environment, resulting in greater data fidelity. This configuration may also have advantages in providing more localized vibration correction by establishing multiple cavity lengths in the reference path (e.g., core 26). The systems and methods are thus useful in subterranean hydrocarbon exploration, drilling and production operations, due to downhole vibrations that may be involved.

The optical fiber assembly 22 and/or the measurement system are not limited to the embodiments described herein, and may be disposed with any suitable carrier. The measurement system, optical fiber assembly 22, the borehole string 14 and/or the tool 18 may be embodied with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In support of the teachings herein, various analysis components may be used, including a digital and/or an analog system. Components of the system, such as the measurement unit 20, the processor 38, the processing assembly 50 and other components of the system 10, may have components such as a processor, storage media, memory, input, output, communications link, user interfaces, software programs, signal processors (digital or analog) and other such components (such as resistors, capacitors, inductors and others) to provide for operation and analyses of the apparatus and methods disclosed herein in any of several manners well appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling unit, heating unit, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a parameter, the apparatus comprising:

an optical fiber including at least one core configured to be optically coupled to a light source and transmit an interrogation signal, the at least one core including a plurality of sensing locations distributed along a measurement length of the optical fiber and configured to reflect light;

a reference optical path configured to transmit a reference signal, the reference optical path disposed in a fixed relationship to the at least one core and extending at least substantially parallel to the at least one core, the reference optical path including a reference reflector that defines a cavity length corresponding to the measurement length;

a detector configured to receive a reflected return signal including light reflected from one or more of the plurality of sensing locations;

a reference interferometer configured to receive at least a reference signal returned from the reference optical path and generate an interferometric reference signal; and a processor configured to apply the interferometric reference signal to the reflected return signal to compensate for one or more environmental parameters.

2. The apparatus of claim 1, wherein the optical fiber is a multi-core optical fiber, and the reference optical path is an additional core within the optical fiber.

3. The apparatus of claim 1, wherein the reference interferometer is a trigger interferometer coupled to a sampler, the sampler configured to sample the reflected return signal according to sampling parameters derived from the interferometric reference signal.

4. The apparatus of claim 1, wherein the optical fiber includes a sensor reference reflector disposed at an axial location that is at least substantially the same as an axial location of the reference reflector.

5. The apparatus of claim 4, further comprising a sensor interferometer configured to generate an interferometric measurement signal by combining the reflected return signal with a sensor reference return signal corresponding to light reflected from the sensor reference reflector in the at least one core.

6. The apparatus of claim 1, wherein the processor is configured to use the compensated reflected return signal to estimate at least one parameter of the optical fiber at one or more locations corresponding to one or more of the sensing locations.

7. The apparatus of claim 6, wherein the processor is configured to apply the interferometric reference signal to the reflected return signal to compensate for vibration, and estimate environmental parameters based on the compensated reflected return signal.

8. The apparatus of claim 1, wherein the reference reflector is selected from at least one of a mirror and a partially reflecting mirror.

9. The apparatus of claim 1, wherein the optical fiber and the reference optical path are configured to be disposed in a borehole in an earth formation.

10. The apparatus of claim 9, wherein the one or more environmental parameters are selected from at least one of temperature, pressure, strain and vibration.

11. The apparatus of claim 1, wherein the light source is configured to emit a coherent swept-wavelength interrogation signal.

12. A method for estimating a parameter, the method comprising:
    disposing an optical fiber in a borehole in an earth formation, the optical fiber including at least one core having a plurality of sensing locations distributed along a measurement length of the optical fiber and configured to reflect light;
    disposing in the borehole a reference optical path configured to transmit a reference signal, the reference optical path disposed in a fixed relationship to the at least one core and extending at least substantially parallel to the at least one core, the reference optical path including a reference reflector that defines a cavity length corresponding to the measurement length;
    transmitting a first interrogation signal into the at least one core;
    transmitting a second interrogation signal into the reference optical path;
    receiving a reflected return signal including light reflected from one or more of the plurality of sensing locations;
    receiving, at a reference interferometer, a reference signal returned from the reference optical path, and generating an interferometric reference signal;
    applying the interferometric reference signal to the reflected return signal to compensate for one or more environmental parameters based on changes in the cavity length of the reference optical path; and
    estimating one or more environmental parameters based on the compensated reflected return signal.

13. The method of claim 12, wherein the optical fiber is a multi-core optical fiber, and the reference optical path is an additional core within the optical fiber.

14. The method of claim 12, wherein the interferometer is a trigger interferometer, and applying the interferometric reference signal includes sampling the reflected return signal according to sampling parameters derived from the interferometric reference signal.

15. The method of claim 12, wherein the optical fiber includes a sensor reference reflector disposed at an axial location that is at least substantially the same as an axial location of the reference reflector.

16. The method of claim 15, further comprising generating an interferometric measurement signal by combining the reflected return signal with a sensor reference return signal corresponding to light reflected from the sensor reference reflector in the at least one core.

17. The method of claim 12, wherein estimating includes using the compensated reflected return signal to estimate at least one parameter of the optical fiber at one or more locations corresponding to one or more of the sensing locations.

18. The method of claim 12, wherein the one or more environmental parameters are selected from at least one of temperature, pressure, strain and vibration.

19. The method of claim 12, further comprising emitting a coherent swept-wavelength interrogation signal from the light source, and splitting the swept-wavelength interrogation signal into the first interrogation signal and the second interrogation signal.

20. The method of claim 12, wherein the interferometric reference signal is applied to the reflected return signal to compensate for a vibration.

* * * * *